United States Patent
Weber

(10) Patent No.: US 6,356,694 B1
(45) Date of Patent: Mar. 12, 2002

(54) PROCESS FOR PRODUCING PLANAR WAVEGUIDE STRUCTURES AS WELL AS WAVEGUIDE STRUCTURE

(75) Inventor: Dieter Weber, Kornwestheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/353,285

(22) Filed: Jul. 14, 1999

(30) Foreign Application Priority Data

Jul. 15, 1998 (DE) .................................. 198 31 719

(51) Int. Cl.⁷ ................................................ G02B 6/10
(52) U.S. Cl. .................... 385/132; 385/131; 385/129; 65/386; 65/429
(58) Field of Search ................................ 385/128, 129, 385/130, 131, 132; 65/386, 397, 388, 391, 400, 429

(56) References Cited

U.S. PATENT DOCUMENTS

| | | | | |
|---|---|---|---|---|
| 4,579,571 A | * | 4/1986 | Hicks, Jr. ..................... | 65/3.12 |
| 4,840,653 A | * | 6/1989 | Rabinovich .................. | 65/3.12 |
| 5,061,029 A | * | 10/1991 | Ishikawa .................... | 385/132 |
| 5,064,266 A | | 11/1991 | Sun et al. | |
| 5,243,677 A | * | 9/1993 | Kanamori et al. ........... | 385/130 |
| 5,556,442 A | * | 9/1996 | Kanamori et al. ............ | 65/17.4 |
| 5,736,429 A | | 4/1998 | Tregoat et al. | |
| 5,885,881 A | * | 3/1999 | Ojha .......................... | 438/381 |

FOREIGN PATENT DOCUMENTS

| | | |
|---|---|---|
| DE | 30 47 589 A1 | 9/1981 |
| DE | 35 36 781 A1 | 4/1987 |
| EP | 0 178 815 A1 | 4/1986 |
| EP | 0 255 270 A2 | 2/1988 |
| EP | 0 607 884 A1 | 7/1994 |
| GB | 2 292 468 A | 2/1996 |
| JP | 09080247 A * | 9/1995 |
| JP | 09 080 047 A | 3/1997 |
| JP | 09 243 846 A | 9/1997 |

OTHER PUBLICATIONS

"Optische Telekommunikationssysteme", pp. 117–223 (discussed in specification).

* cited by examiner

Primary Examiner—Hemang Sanghavi
Assistant Examiner—Omar Rojas

(57) ABSTRACT

A process for producing a waveguide, wherein a first layer is deposited on a silicon or glass substrate, a core structure is subsequently structured, and the core structure is protected by a protective layer. Prior to each step for depositing a new layer, the layer that has just been applied is fluorinated.

4 Claims, 2 Drawing Sheets

PROCESS FOR PRODUCING PLANAR WAVEGUIDE STRUCTURES AS WELL AS WAVEGUIDE STRUCTURE

This application is based on and claims the benefit of German Patent Application No. 198 31 719.0 filed Jul. 15, 1998, which is incorporated by reference herein.

BACKGROUND OF THE INVENTION

The invention is based on a process for producing planar waveguide structures as well as a waveguide structure according to the generic class of the independent claims.

The literature, for example, "Optische Telekommunikationssysteme," [Optical Telecommunications Systems] Publisher Hagen Pultsch, describes manufacturing processes (see pp. 117 ff.) and waveguide structures produced by these manufacturing processes (see pp. 221 ff.).

To guide light in an optical waveguide the refractive index of the waveguide must be greater than the refractive index of its environment. In principle, the planar waveguide comprises a dielectric circuit carrier, a substrate with a first refractive index $n_1$, on which is located a waveguiding dielectric with a refractive index $n_2$. The cover layer is either air or an additional dielectric with a refractive index $n_3$. With this structure, light can be guided along the boundary surfaces of the waveguide due to repeated total reflections. Examining the field strength distribution of a light wave in a strip line, one can see that the field along the field boundary to the neighboring medium does not abruptly die down to zero. The waveguides behave as open waveguides. If the refractive index differences between the waveguides of the structure and the environment are sufficiently large, the field spurs extend only slightly out of the waveguiding structure. To obtain optimum waveguidance it is desirable to keep the refractive index difference large and, in particular, to make the structure along the boundary clean during the manufacturing process.

Various problems are encountered when manufacturing waveguide structures in glass or silicon material by means of known processes such as glass deposition from the vapor phase. Under the action of high temperatures, the waveguides are frequently deformed and are subject to stresses. Both problems result in poor light guidance within the waveguide. Applying an upper cover layer frequently causes bubble structures, which also impair the quality of the waveguide. Furthermore, out-diffusion of doping materials from the optical core into the surrounding layers occurs. As a result, the jump in the refractive index along the boundary layer is not sharp enough to bring about clean waveguidance.

SUMMARY OF THE INVENTION

The process according to the invention with the characteristic features of the independent claim has the advantage that it describes a simple way to structure the optical core such that an optimal symmetrical sphere surrounds the core and prevents out-diffusion of doping materials. Furthermore, the symmetrical sphere consisting of a fluoride-containing layer has a stabilizing effect on the shape of the core and thus reduces stress in the waveguide structure.

The measures set forth in the subclaims provide an advantageous further development and improvement of the process defined in the independent claim.

The process is particularly advantageous for different waveguide structures based on glass or silicon, whereby the layers are created, for example, by flame hydrolysis. The core structure can advantageously be structured by a reactive ion etching process.

Furthermore, it is advantageous to produce the fluoride-containing layer by applying a fluoride-containing liquid. This has moreover the advantage of creating a very thin fluoride layer, which has a markedly changed refractive index compared to the material of the waveguide. A layer thickness on the order of 150 nm is optimal. Applying a fluoride-containing liquid has the additional effect of cleaning the structure material.

The inventive waveguide with the characteristics of the independent claim has the advantage that it permits very clean wave guidance, whereby the manufacturing process itself is not burdened by costs and complex work operations.

BRIEF DESCRIPTION OF THE DRAWING

The drawing depicts an exemplary embodiment of the invention and is further explained in the description below.

DETAILED DESCRIPTION OF THE INVENTION

Figure 1A:
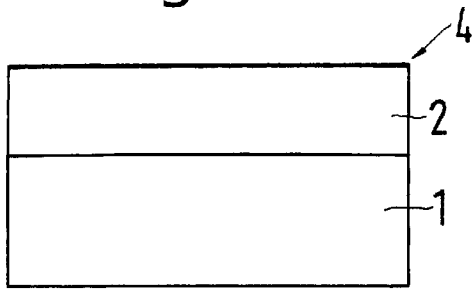
FIGS. 1A–1D show phases 1 through 4 in the production of a waveguide according to the present invention.
Figure 1B:
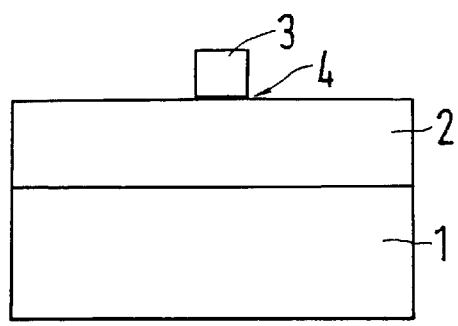

In a first manufacturing step, a lower layer 2, which is thick compared to the core, is produced on a substrate surface 1. This lower layer is made, for example, of silicon oxide, which is doped with boron oxide or germanium oxide. This layer is deposited on the substrate by means of flame hydrolysis. For this purpose, the basic substances for the process, highly pure liquid chlorides, are vaporized. The chlorides are introduced into the reaction chamber together with a carrier gas and possibly drying gases. The energy required for depositing the glass is produced either externally by a burner or furnace or by interaction with a plasma and high temperature. Adding chlorides of other elements, for example, boron or germanium, to the silicon tetrachloride produces glasses whose refractive index differs from that of pure quartz glass. The softening temperature of layer 2 is highest relative to the layers subsequently to be deposited. The lower layer 2 is sintered onto the substrate, e.g. a silicon or quartz glass wafer. The surface of layer 2 is etched with a fluoride-containing solution, e.g. a BHF solution (buffered HF solution) or with diluted hydrofluoric acid. In the boundary phase, etching produces a thin layer with high fluoride content, on which the material of the next layer can subsequently be deposited. On the fluoride-containing boundary layer 4, a silicon oxide core layer 3 is deposited. This glass layer is doped, for example, with boron oxide, germanium oxide, and/or phosphorus oxide, to increase the refractive index of the glass material. Depending on the requirement of the integrated optical structure, this layer 3 remains complete or is structured. Structuring of the waveguide can be accomplished, for example, by reactive ion etching (RIE). For this purpose, a plasma is produced in the reaction chamber, in which reactive and ionized molecules are created, which are accelerated toward the specimen by the voltage drop formed on the cathode, the substrate itself. This etching process produces, for example, the structure of waveguide 3 depicted in FIG. 1B. CHF3 and oxygen, for example, are used as etching gases. The entire surface structure comprising the lower layer 2 and the waveguiding structure 3 is treated with a BHF solution or diluted hydrofluoric acid analogously to the process in FIG.

Figure 1C:
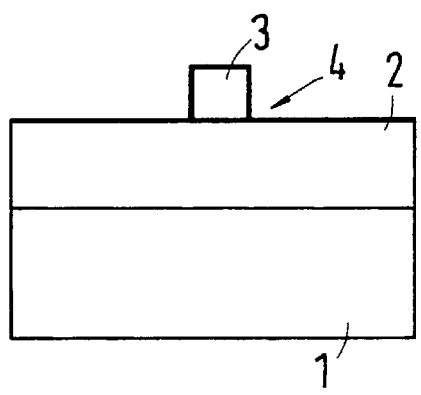
Figure 1D:
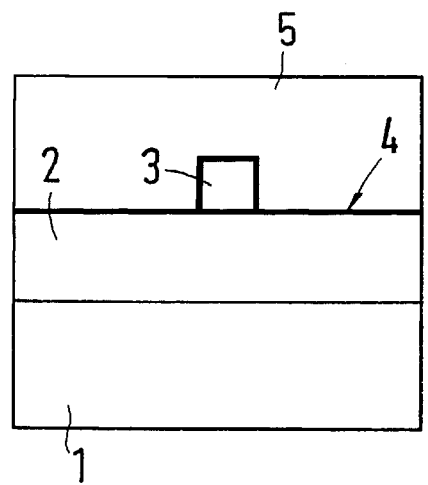

1A. This causes the silicate layer to be slightly removed and the boundary layer to be fluorinated. The fluoride-containing material has the property of lowering the refractive index and, what is far more interesting, of suppressing the migration of the doping materials within the glass, e.g., the germanium, phosphorus, and boron ions. If an optically guiding core 3 is provided with a very thin fluoride layer 4 having an index that is markedly changed relative to the rest of the core material, this layer does not negatively affect light guidance. The preferred layer thickness is on the order of 150 nm. This layer thickness is simultaneously sufficient to prevent migration of the doping materials from or into the core material. An added effect of fluorination of the etched structure material is the cleaning of the surface from interfering impurities. During etching, a thin layer with high fluoride content is created in the boundary phase onto which the material of the core and/or the upper cover layer is subsequently deposited. At the same time, the fluoride-containing boundary layer has a form stabilizing effect since the softening point of this glass layer is higher than that of the neighboring materials. Thus, the core is less exposed to the pressure of the neighboring materials, the stresses are reduced, and the refractive index of the light guiding core remains constant due to constant concentration and reduced stresses. Following application of the fluoride layer in FIG. 1C, the upper cover layer 5 is deposited. This layer is again created by flame hydrolysis and subsequent sintering of the material. After completion of the production process, core 3 is uniformly surrounded by a thin fluoride layer 4. The cover layer 5 preferably has a refractive index that is analogous to the lower layer 2, whereby the softening temperature of the material must be lower so that substrate, lower layer, and core material are not excessively deformed by the sintering process. Applying a thin fluoride-containing layer 4 is particularly advantageous for suppressing bubble defects caused by sintering of cover layer 5.

Figure 2A:
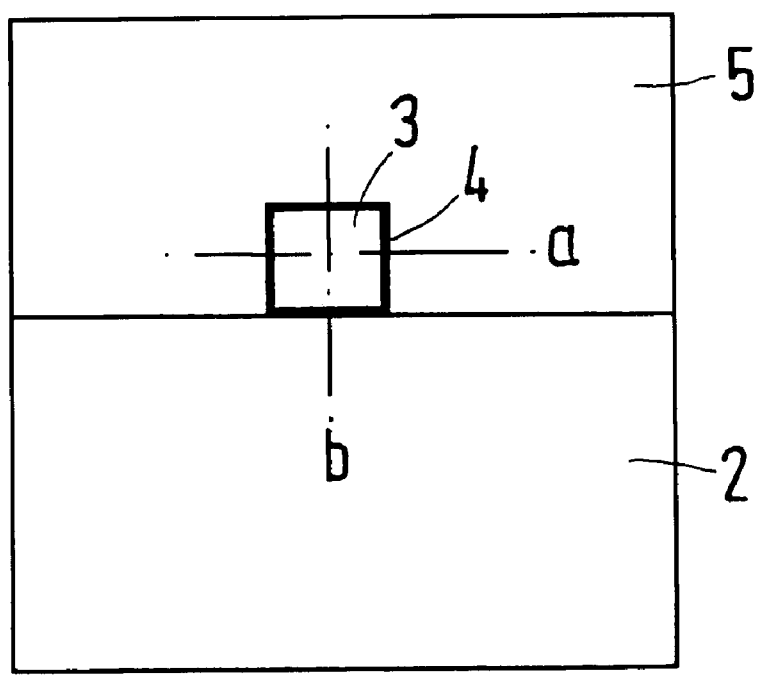
FIGS. 2A–2B show the index profile of a waveguide produced according to the present invention.
Figure 2B:
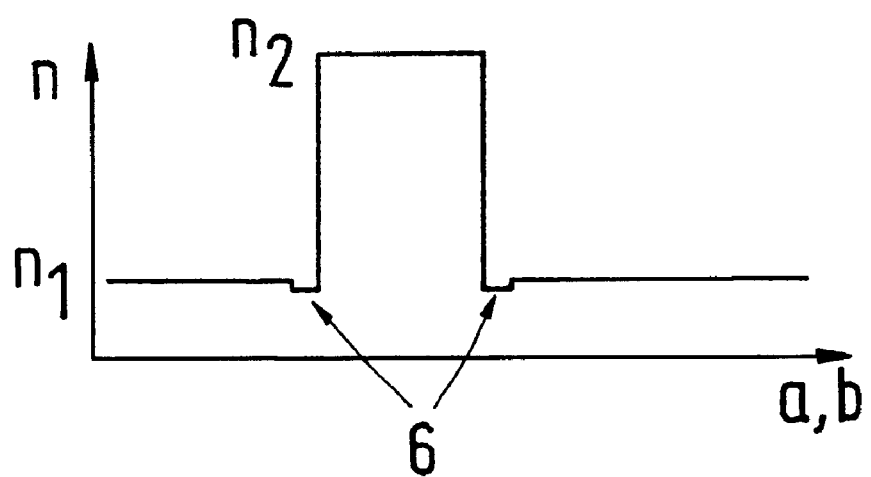

FIG. 2, by way of example, shows the course of the refractive index n over cross-section axes a and b. A strong jump in the index is evident in the region of the core material 3. The thin fluoride-containing layer causes a slight drop in the refractive index at the points identified by 6. This effect is exaggerated in the graph. It is sufficient to obtain a sharp juncture between refractive indices $n_1$ and $n_2$ to describe a high-quality waveguide. Applying the fluoride-containing layer improves the ideally depicted jump in the refractive index to a sharper edge. Overall, this increases the quality of the waveguide structure and reduces optical attenuation.

What is claimed is:

1. A process for producing planar waveguide structures, comprising the steps of:

depositing a first lower layer (2) on a silicon or glass substrate (1);

etching the first lower layer (2) to provide a first fluoride layer;

depositing a core structure (3) on the first fluoride layer of the first lower layer (2);

etching the core structure (3) to provide a second fluoride layer; and depositing a cover layer (5) to protect the core structure (3), wherein the etching steps are effected by applying a fluoride-containing liquid.

2. The process according to claim 1, wherein the first lower and the cover layers are produced by a process using one of Si, B and Ge halides.

3. The process according to claim 1 or 2, wherein the core structure is structured by a process.

4. The process according to claim 1, wherein the etching steps produce a 150 nm thick fluoride-containing layer that surrounds the core structure.

* * * * *